United States Patent [19]

Tonkovich

[11] Patent Number: 4,785,910
[45] Date of Patent: Nov. 22, 1988

[54] VEHICLE BUMPER STEP

[76] Inventor: Kenneth E. Tonkovich, 19 Longshore, Irvine, Calif. 92714

[21] Appl. No.: 88,859

[22] Filed: Aug. 24, 1987

[51] Int. Cl.⁴ .................................................. B60K 3/00
[52] U.S. Cl. ................................... 182/92; 182/61; 280/163
[58] Field of Search ................. 182/150, 92, 55, 61; 280/163

[56] References Cited

U.S. PATENT DOCUMENTS

| | | | |
|---|---|---|---|
| 2,194,978 | 3/1940 | Ireland | 182/55 |
| 2,378,678 | 7/1943 | Anderson . | |
| 2,878,078 | 3/1959 | Moultrop | 182/150 |
| 3,011,587 | 12/1961 | Mallog | 182/150 |
| 3,159,242 | 12/1964 | James | 182/92 |
| 3,357,719 | 8/1965 | McCrea . | |
| 3,394,947 | 9/1966 | Strube, Sr. . | |
| 3,463,509 | 11/1967 | Schiffner . | |
| 3,507,515 | 9/1968 | Brammer . | |
| 3,716,254 | 2/1973 | Tarvin . | |
| 3,794,345 | 2/1974 | Locke . | |
| 3,858,905 | 1/1975 | Peebles . | |
| 4,057,125 | 11/1977 | Kroft . | |
| 4,159,122 | 6/1979 | Stevens . | |
| 4,194,754 | 3/1980 | Hightower . | |
| 4,198,070 | 4/1980 | Weiler . | |
| 4,274,648 | 6/1981 | Robins . | |
| 4,405,141 | 9/1983 | Jurek . | |
| 4,605,098 | 8/1986 | Leuty . | |
| 4,620,609 | 11/1986 | Elsten . | |

Primary Examiner—Reinaldo P. Machado
Attorney, Agent, or Firm—Loyal M. Hanson; Gordon L. Peterson

[57] ABSTRACT

A bumper step includes a rigid base, a pair of first and second elongated hook members adapted to be mounted on an upper portion of a bumper in spaced apart relationship, and a pair of first and second brackets with which to support the base from the hook members. The lower end portion of each one of the brackets is mounted on a respective one of the end portions of the base so that each one of the brackets can be pivoted approximately ninety degrees between a folded position in which the bracket lies generally flat against the upper base surface and an extended position in which the bracket extends generally perpendicular to the upper base surface. An opposite end portion of each one of the hook members is mounted on the upper end portion of a respective one of the first and second brackets so that with the hook members engaging the upper portion of the bumper and the brackets in the extended position, the brackets extend downwardly from the hook members toward the base, the longitudinal edge portion of the base is disposed toward the bumper, the base extends outwardly from the bumper, and the upper base surface is disposed in a position facing generally upwardly to provide a surface upon which to stand.

6 Claims, 2 Drawing Sheets

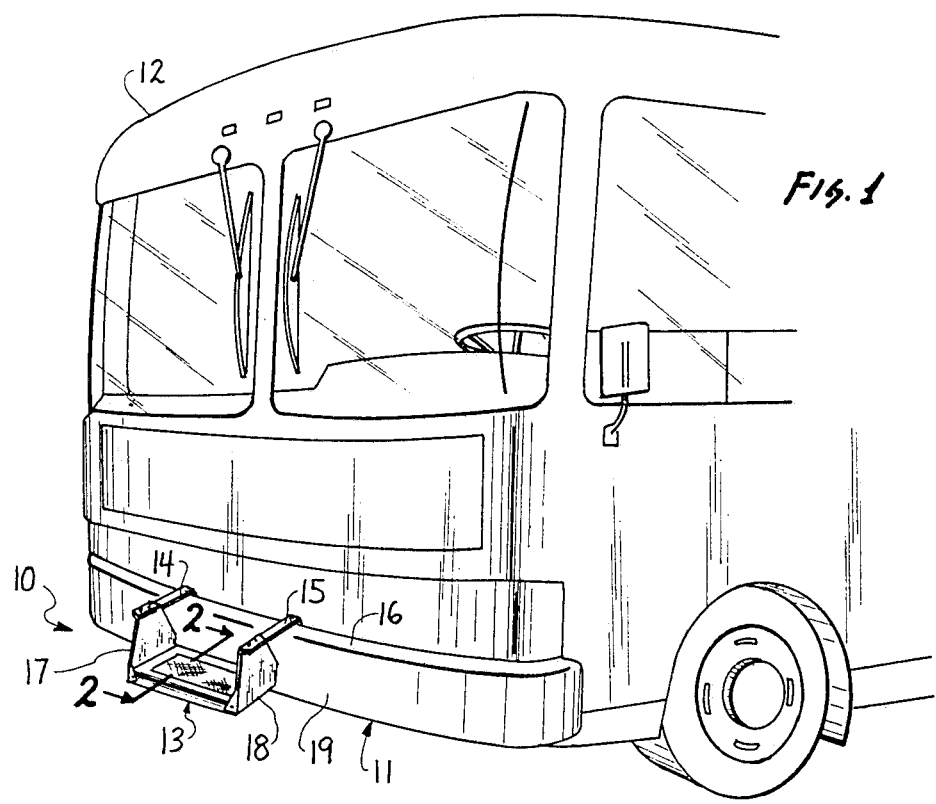
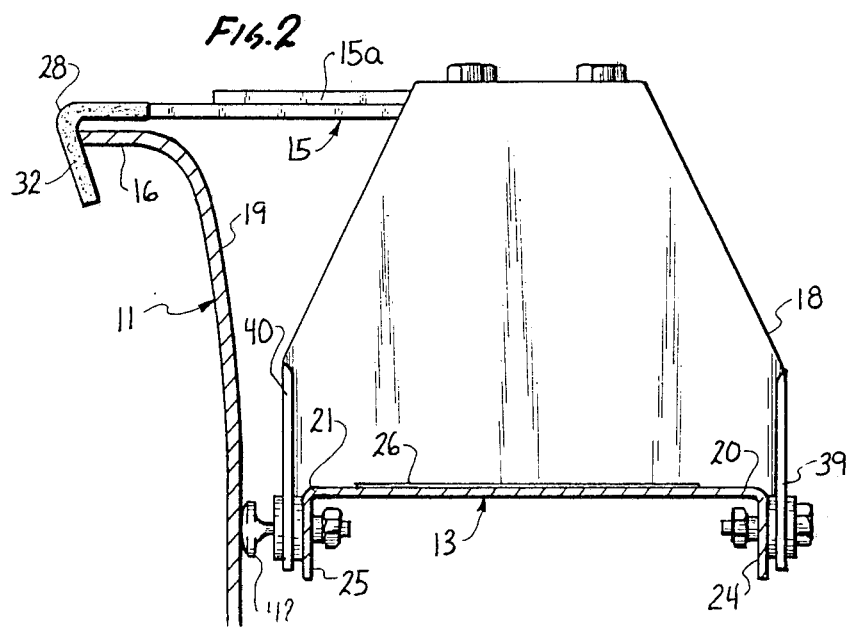

VEHICLE BUMPER STEP

BACKGROUND OF THE INVENTION

1. Technical Field

This invention relates generally to motor vehicle accessories, and more particularly to a new and improved platform or step to be mounting on a vehicle bumper.

2. Background Information

A vehicle bumper step serves as a platform upon which the user can stand. It mounts on the bumper of a vehicle, such as a van, motor home, or cab of a semitrailer, where it enables the user to more easily and safely reach various portions of the vehicle. It may be used, for example, to gain extra height in order to wash the vehicle, access the motor compartment, or reach the roof ladder of a motor home.

However, existing bumper steps have certain drawbacks that need to be overcome. They may be complicated to assemble, for example. In addition, they may occupy more storage space when not in use than desired. Some do not conveniently fit various types of bumpers,(and others may fail to provide a solid, safe platform upon which to stand. Consequently, it is desirable to have a new and improved vehicle bumper step that overcomes these concerns.

SUMMARY OF THE INVENTION

This invention recognizes the problems associated with the prior art and provides a new and improved vehicle bumper step with the desired attributes. Briefly, the above and further objects of the present invention are realized by providing a hook-on bumper step that can be conveniently folded into a compact configuration for storage, and quickly unfolded for mounting on the bumper.

Generally, the bumper step includes a rigid base having an upper base surface and a longitudinal edge portion extending between opposite first and second end portions, a pair of first and second elongated hook members adapted to be mounted on an upper portion of a bumper in spaced apart relationship, and a pair of first and second brackets with which to support the base from the hook members.

Each one of the hook members extends between a hook-shaped end portion and an opposite end portion, which hook-shaped end portion is adapted to removably engage or hook onto the upper portion of the bumper with the elongated portion extending outwardly from the bumper. Each one of the brackets has opposite upper and lower end portions, and the lower end portion of each is mounted on a respective one of the first and second end portions of the base. It is mounted so that the bracket can be pivoted approximately ninety degrees between a folded position in which the bracket lies generally flat against the upper base surface and an extended position in which the bracket extends generally perpendicular to the upper base surface.

In addition, the opposite end portion of each one of the hook members is mounted on the upper end portion of a respective one of the brackets. This is done so that with the hook members engaging the upper portion of the bumper and the brackets in the extended position, the brackets extend downwardly from the hook members toward the base, the longitudinal edge portion of the base is disposed toward the bumper, the base extends outwardly from the bumper, and the upper base surface is disposed in a position facing generally upwardly to provide a surface upon which to stand.

Thus, the bumper step can be conveniently folded into a compact configuration for storage, and easily unfolded for mounting on the bumper without requiring assembly. It can be adjusted to fit different bumpers, and it provides a solid, safe platform upon which to stand.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 1 of the drawings is a perspective view of a vehicle bumper step constructed according to the invention shown mounted on the front bumper of a conventional motor home;

FIG. 2 is an enlarged cross sectional view of the bumper step taken on line 2—2 of FIG. 1;

DESCRIPTION OF THE PREFERRED EMBODIMENTS

Figure 3:
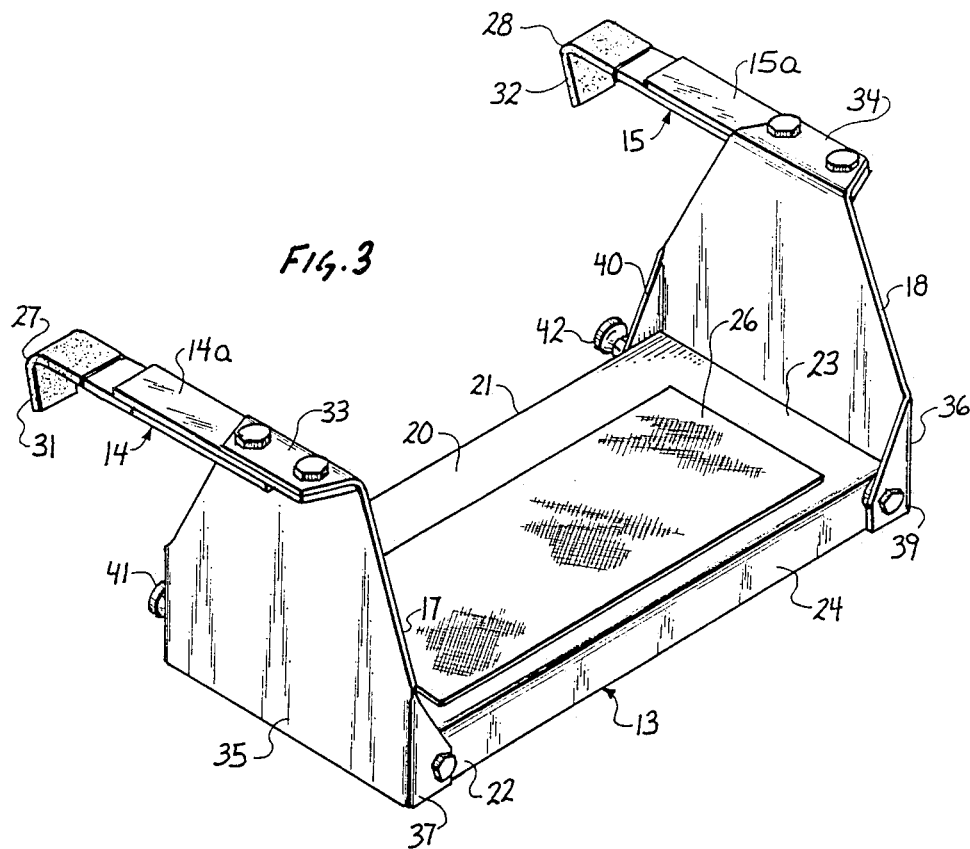
FIG. 3 is an enlarged perspective view of the bumper step ready to be mounted on the bumper.

Referring now to the drawings, there is shown a new and improved bumper step 10 constructed according to the invention, shown removably mounted on a front bumper 11 of a conventional vehicle 12. Of course, it can also be mounted on a rear bumper.

Generally the bumper step 10 includes a rigid base 13, a pair of first and second elongated hook members 14 and 15 adapted to removably hook onto an upper portion 16 of the bumper 11, and a pair of first and second brackets 17 and 18 with which to support the base from the hook members 14 and 15. When mounted on the bumper 11, the bumper step 10 bears against a forward surface 19 of the bumper 11 to provide a solid platform on which to stand.

Figure 4:
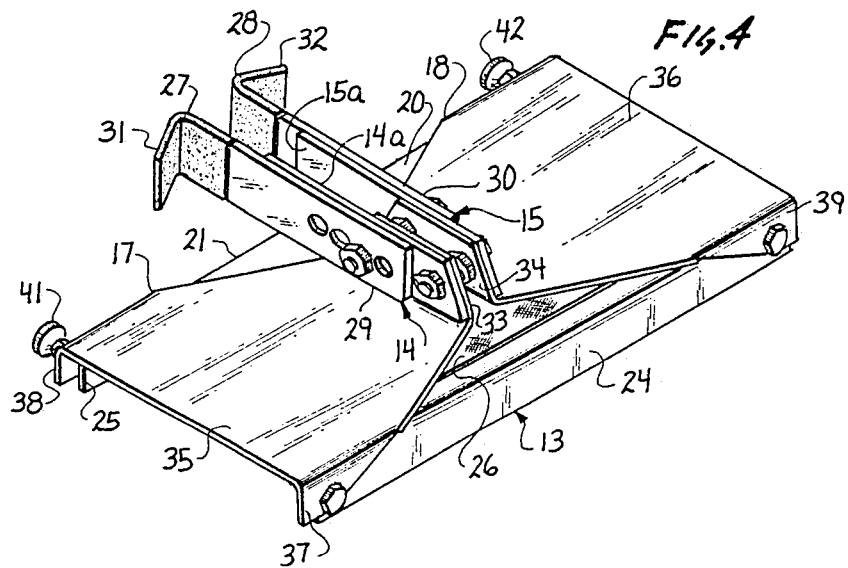
FIG. 4 is an enlarged perspective view showing the bumper step a folded configuration for storage.

Further details of these components are shown in FIGS. 2-4. The base 13 includes an upper base surface 20 and a longitudinal edge portion 21 extending between opposite first and second end portions 22 and 23 (FIG. 3). The upper base surface 20 is of sufficient size to enable a person to stand atop the upper base surface 20 with both feet positioned side-by-side, the illustrated embodiment being approximately twelve inches long (along the longitudinal edge 21) and approximately six inches wide for this purpose.

The base 13 is composed of a material having sufficient strength to support a person, such as a metal alloy, and it is formed according to known techniques, such as being stamped or sheared and bent. The illustrated base 13 is fabricated in the form of an inverted channel having downwardly extending sides 24 and 25, and this provides increased strength while providing structure on which to mount the brackets 17 and 18 as subsequently described.

A suitable friction enhancing member 26, such as a sheet of commercially available non-skid tape, is attached to the upper base surface 20 by suitable means, such as an adhesive backing on the tape, where it serves as means for enhancing frictional engagement of the upper base surface 20 by a user. Of course, other friction enhancing arrangements, such as grooves formed in the upper base surface 20, can be used with the result that the user is less likely to slip off of the upper surface 20.

Considering now the elongated hook members 14 and 15, they are adapted to be removably mounted on the upper portion 16 of the bumper 11 in spaced apart relationship. Each one of the hook members 14 and 15 extends between a hook-shaped end portion (hooks 27 and 28) and an opposite end portion (end portions 29 and 30). The hooks 27 and 28 have a size and shape adapted to removably engage or hook onto the upper portion 16 of the bumper 11 (FIG. 2) with the end portions 29 and 30 extending outwardly from the bumper 11, beyond the forward surface 19. Thus configured, the hook members 14 and 15 can be removably mounted on any of various conventional bumpers.

The hook members 14 and 15 are also composed of a suitable strong material, such as a metal alloy, those illustrated being fabricated according to known techniques from one inch wide, one fourth inch thick steel. In order to inhibit marring or other damage to the bumper, the hooks 27 and 28 are coated with a material that is more compliant than the metal alloy. The hooks 27 and 28 may be dipped in plastic for this purpose to result in the illustrated coatings 31 and 32.

The brackets 17 and 18 support the base 13 from the hook members 14 and 15. They are fabricated from a suitable strong material, such as a metal alloy, and each one includes an upper portion (flanges 33 and 34) connected to a respective one of the hook members 14 and 15, and a lower portion (lower portions 35 and 36) connected to the base 13.

The lower portion 35 of the bracket 17 includes a pair of ears 37 and 38 that are pivotally mounted on the end portion 22 of the base 13 by suitable known means, such as a bolt extending through holes in the bracket 17 and the sides 24 and 25 of the base 13. Similarly, the lower portion 36 of the bracket 18 includes a pair of ears 39 and 40 that are pivotally mounted on the end portion 23 of the base 13.

This mounting arrangement serves as first mounting means for mounting the lower end portion of each one of the brackets 17 and 18 on a respective one of the first and second end portions 22 and 23 of the base 13 so that each one of the brackets can be pivoted approximately ninety degrees between a folded position in which the bracket lies generally flat against the upper base surface 20 (FIG. 4) and an extended position in which the bracket extends generally perpendicular to the upper base surface 20 (FIG. 3). This results in a bumper step that can be conveniently folded into a compact configuration for storage, and yet be easily unfolded for use.

The end portions 29 and 30 of the hook members 14 and 15 are mounted on the flanges 33 and 34 by suitable known means, such as bolts passing through holes in the end portions 29 and 30 and the flanges 33 and 34. The hook members 14 and 15 may be provided with a plurality of holes for this purpose to enable adjustment of the distance the hooks 27 and 28 extend from the flanges 33 and 34 according to bumper dimensions. In addition, the flanges 33 and 34 may be provided with a plurality of holes so that the brackets 17 and 18 can be used on either the left or right side of the bumper step 10.

The illustrated embodiment also includes extra support bars 14a and 15a disposed between the hook members 14 and 15 and the flanges 33 and 34. These provide extra support to the hook members 14 and 15 to inhibit bending under heavy load.

This arrangement serves as second mounting means for adjustably mounting the end portions 29 and 30 of the hook members 14 and 15 on the flanges 33 and 34 so that with the hook members 14 and 15 engaging the upper portion 16 of the bumper 11 and the brackets 17 and 18 in the extended position, the brackets 17 and 18 extend downwardly from the hook members 14 and 15 toward the base 13, the longitudinal edge portion 21 of the base 13 is disposed toward the bumper 11, the base 13 extends outwardly from the bumper 11, and the upper base surface 20 is disposed in a position facing generally upwardly to provide a surface upon which to stand.

In this position, the bumper step 10 bears against the forward surface 19 of the bumper 11. In the illustrated embodiment, a pair of bolts 41 and 42 are used to pivotally mount the brackets 17 and 18 to the base 13, and these extend from the bumper step toward the bumper 11 to bear against the forward surface 19. The bolts 41 and 42 can be adjusted to vary the distance they extend from the bumper step toward the bumper 11, and this enables adjustment of the position of the base 11 so that the upper base surface 20 can be leveled. Like the hooks 27 and 28, portions of the bolts 41 and 42 may be coated with a suitably compliant material to inhibit damage to the bumper 11.

Thus, this invention provides a bumper step that can be conveniently folded into a compact configuration for storage. In addition, it can be easily unfolded for mounting on the bumper without requiring assembly. It can be quickly adjusted to fit different bumpers, and it provides a solid, safe platform upon which to stand.

Although an exemplary embodiment of the invention has been shown and described, many changes, modifications, and substitutions may be made by one having ordinary skill in the art without necessarily departing from the spirit and scope of this invention.

What is claimed is:

1. A bumper step, comprising:
   a rigid base having an upper base surface and a longitudinal edge portion extending between opposite first and second end portions of the base;
   a pair of first and second elongated hook members adapted to be mounted on an upper portion of a bumper in spaced apart relationship, each one of the hook members extending between a hook-shaped end portion and an opposite end portion of the hook member, which hook-shaped end portion is adapted to removably engage the upper portion of the bumper with the elongated portion extending outwardly from the bumper;
   a pair of first and second brackets with which to support the base from the hook members, each one of the brackets having opposite upper and lower end portions;
   the lower end portion of each one of which brackets is mounted on a respective one of the first and second end portions of the base to enable each one of the brackets to be pivoted approximately ninety degrees between a folded position in which the bracket lies generally flat against the upper base surface and
   an extended position in which the bracket extends generally perpendicular to the upper base surface; and the opposite end portion of each one of which hook members is mounted on the upper end portion of a respective one of the first and second brackets in a fixed position relative to the respective one of the first and second brackets such that with the hook members engaging the upper portion of the bumper and the brackets in the extended position, the brackets extend downwardly from the hook members toward the base, the longitudinal edge portion of the base is disposed toward the bumper, the base extends outwardly from the bumper, and the upper base surface is disposed in a position facing generally upwardly to provide a surface upon which to stand;

the bumper step further comprising:

a pair of protruding members, each of which protruding members is attached to a respective one of the first and second end portions of the base to extend an adjustable distance from the longitudinal edge portion toward the bumper and bear against the bumper to enable adjustment of the position of the upper base surface;

wherein:

the protruding members are a pair of bolt members utilized to mount the lower end portions of the brackets on the base;

each one of the bolt members includes a head adapted to bear against the bumper; and the head of each one of the bolt members is covered with a material that is more compliant than the metal alloy in order to inhibit damage to the bumper.

2. A bumper step as recited in claim 1, wherein:

the hook members are composed of a metal alloy; and the hook-shaped end portion of each one of the hook members is coated with a material that is more compliant than the metal alloy.

3. A bumper step as recited in claim 1, further comprising:

means for enhancing frictional engagement of the upper base surface by a user.

4. A bumper step as recited in claim 3, wherein the means for enhancing frictional engagement includes:

a sheet of nonskid tape attached to the upper base surface.

5. A bumper step as recited in claim 1, wherein:

the opposite end portion of each one of the hook members is mounted adjustably on the upper end portion of a respective one of the first and second brackets to thereby enable the hook members to be adjusted in order to fit a particular bumper.

6. A bumper step, comprising:

a rigid base having an upper base surface and a longitudinal edge portion extending between opposite first and second end portions of the base;

a pair of first and second elongated hook members adapted to be mounted on an upper portion of a bumper in spaced apart relationship, each one of the hook members extending between a hook-shaped end portion and an opposite end portion of the hook member, which hook-shaped end portion is adapted to removably engage the upper portion of the bumper with the elongated portion extending outwardly from the bumper;

a pair of first and second brackets with which to support the base from the hook members, each one of the brackets having opposite upper and lower end portions;

the lower end portion of each one of which brackets is mounted on a respective one of the first and second end portions of the base to enable each one of the brackets to be pivoted approximately ninety degrees between a folded position in which the bracket lies generally flat against the upper base surface and an extended position in which the bracket extends generally perpendicular to the upper base surface;

the opposite end portion of each one of which hook members is mounted on the upper end portion of a respective one of the first and second brackets in a position such that with the hook members engaging the upper portion of the bumper and the brackets in the extended position, the brackets extend downwardly from the hook members toward the base, the longitudinal edge portion of the base is disposed toward the bumper, the base extends outwardly from the bumper, and the upper base surface is disposed in a position facing generally upwardly to provide a surface upon which to stand;

a pair of protruding members, each of which protruding members is attached to a respective one of the first and second end portions of the base to extend an adjustable distance from the longitudinal edge portion toward the bumper and bear against the bumper to enable adjustment of the position of the upper base surface; and means for enhancing frictional engagement of the upper base surface by a user;

wherein the protruding members are composed of a pair of bolt members utilized to mount the lower end portions of the brackets on the base, each one of the bolt members includes a head adapted to bear against the bumper, and the head of each one of the bolt members is covered with a material that is more compliant than the metal alloy in order to inhibit damage to the bumper;

wherein the hook members are composed of a metal alloy, and the hook-shaped end portion of each one of the hook members is coated with a material that is more compliant than the metal alloy; and wherein the opposite end portion of each one of the hook members is mounted adjustably on the upper end portion of a respective one of the first and second brackets to thereby enable the hook members to be adjusted in order to fit a particular bumper.

* * * * *